United States Patent [19]

Bletz et al.

[11] 4,047,189
[45] Sept. 6, 1977

[54] ELECTRONIC STORAGE, INDICATOR AND EXPOSURE TIME CONTROL DEVICE FOR PHOTOGRAPHIC CAMERAS

[75] Inventors: Walter Bletz, Braunfels; Werner Holle, Wetzlar, both of Germany

[73] Assignee: Ernst Leitz GmbH, Wetzlar, Germany

[21] Appl. No.: 666,944

[22] Filed: Mar. 15, 1976

Related U.S. Application Data

[63] Continuation of Ser. No. 437,142, Jan. 28, 1974, abandoned.

[30] Foreign Application Priority Data

Feb. 5, 1973  Germany ............................. 2305523

[51] Int. Cl.² .............................................. G03B 7/08
[52] U.S. Cl. .................................. 354/23 D; 354/24; 354/50; 354/53; 354/60 A; 354/60 L
[58] Field of Search ................. 354/23 D, 24, 50, 51, 354/60 R, 60 A, 53, 60 L; 307/293

[56] References Cited

U.S. PATENT DOCUMENTS

| 3,824,608 | 4/1974 | Toyoda | 354/23 D |
|---|---|---|---|
| 3,843,249 | 10/1974 | Kitaura | 354/23 D |
| 3,868,704 | 2/1975 | Yamada et al. | 354/23 D |
| 3,879,118 | 4/1975 | Kiyohara et al. | 354/23 D |
| 3,900,855 | 8/1975 | Stempeck | 354/23 D |
| 3,903,528 | 9/1975 | Kee | 354/23 D |
| 3,909,137 | 9/1975 | Kisanuki | 354/23 D |
| 3,945,025 | 3/1976 | Stempeck | 354/23 D |

Primary Examiner—Russell E. Adams
Attorney, Agent, or Firm—Gilbert L. Wells

[57] ABSTRACT

An electronic device for storing and indicating illumination parameters and for controlling the exposure time for photographic cameras having an exposure meter and a timer. The exposure meter includes an analog/-digital converter with a digital storage part having a plurality of binary stages. These various stages correspond to different intensities of illumination of an object. The timer includes a combination of binary ratio reducers and logic gates and these are adapted to be selected by the analog/digital converter or by manual adjustment. A generator produces impulses which control the timer.

12 Claims, 8 Drawing Figures

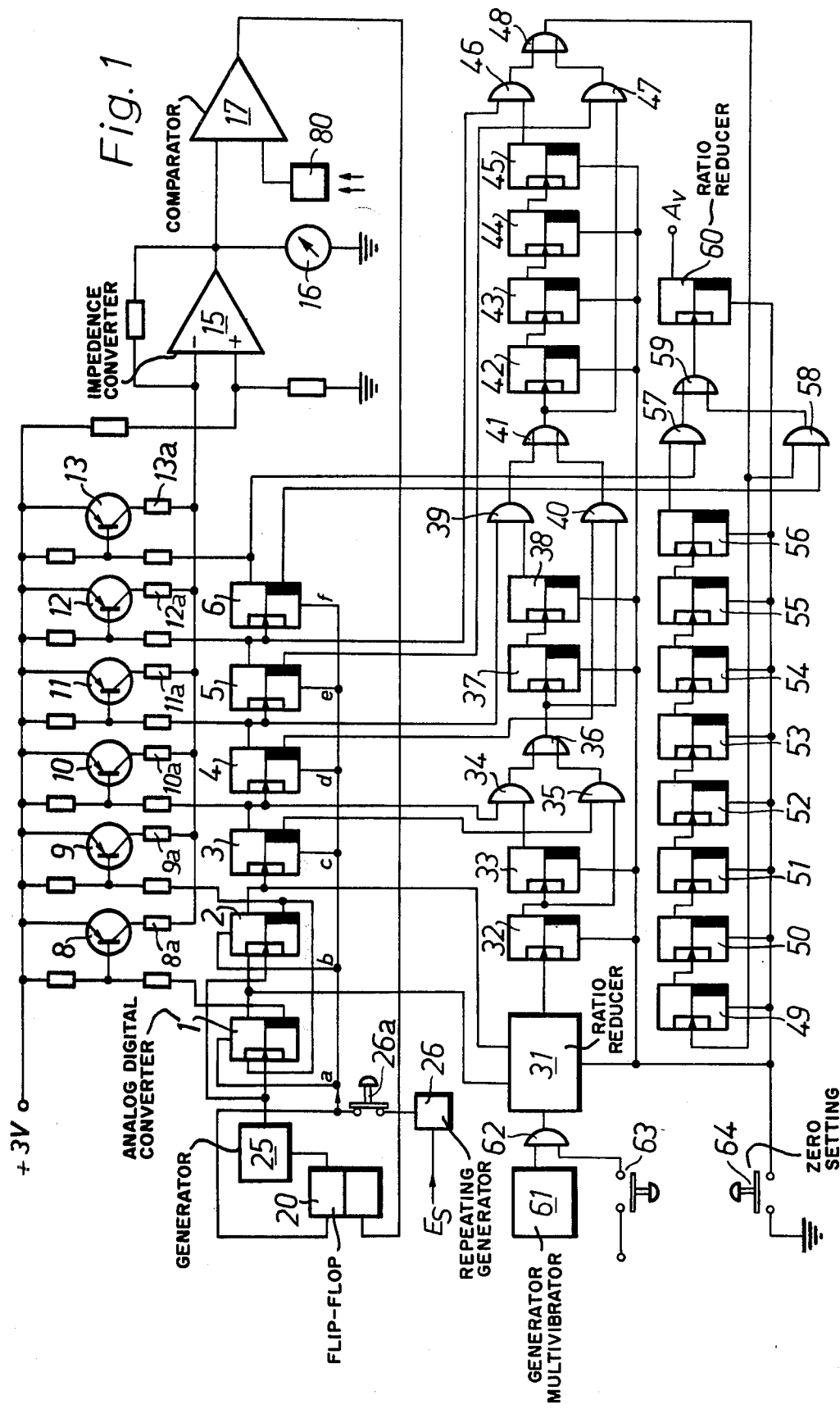

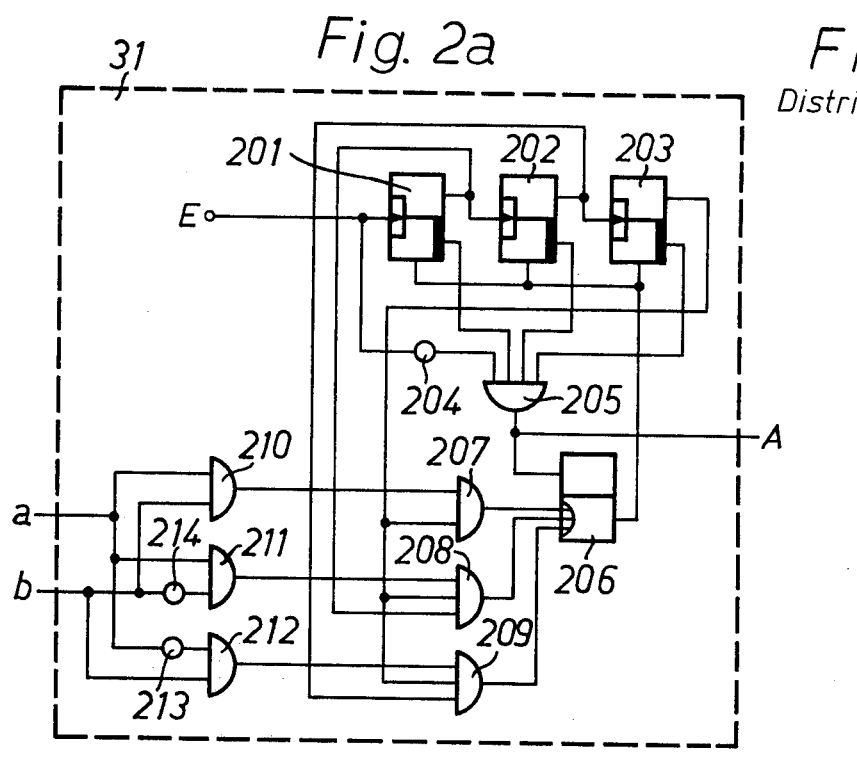
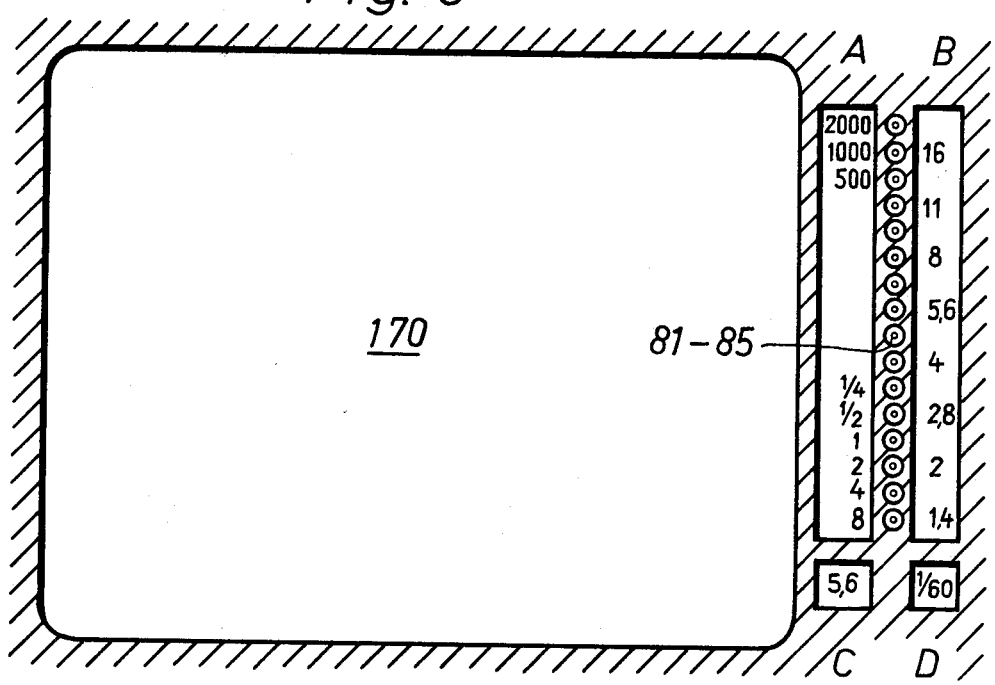

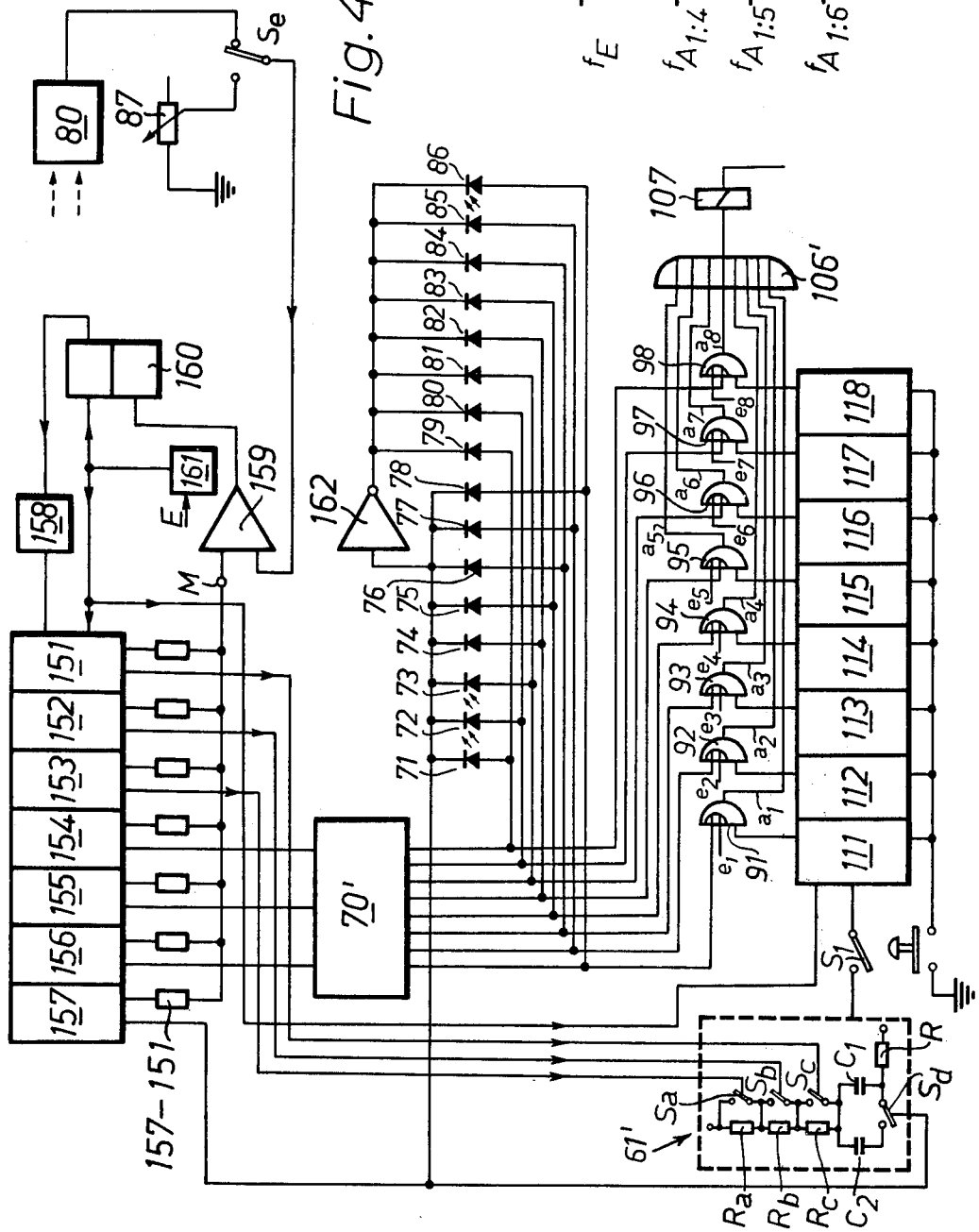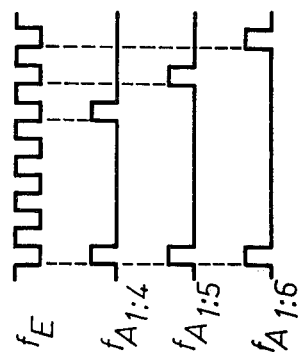

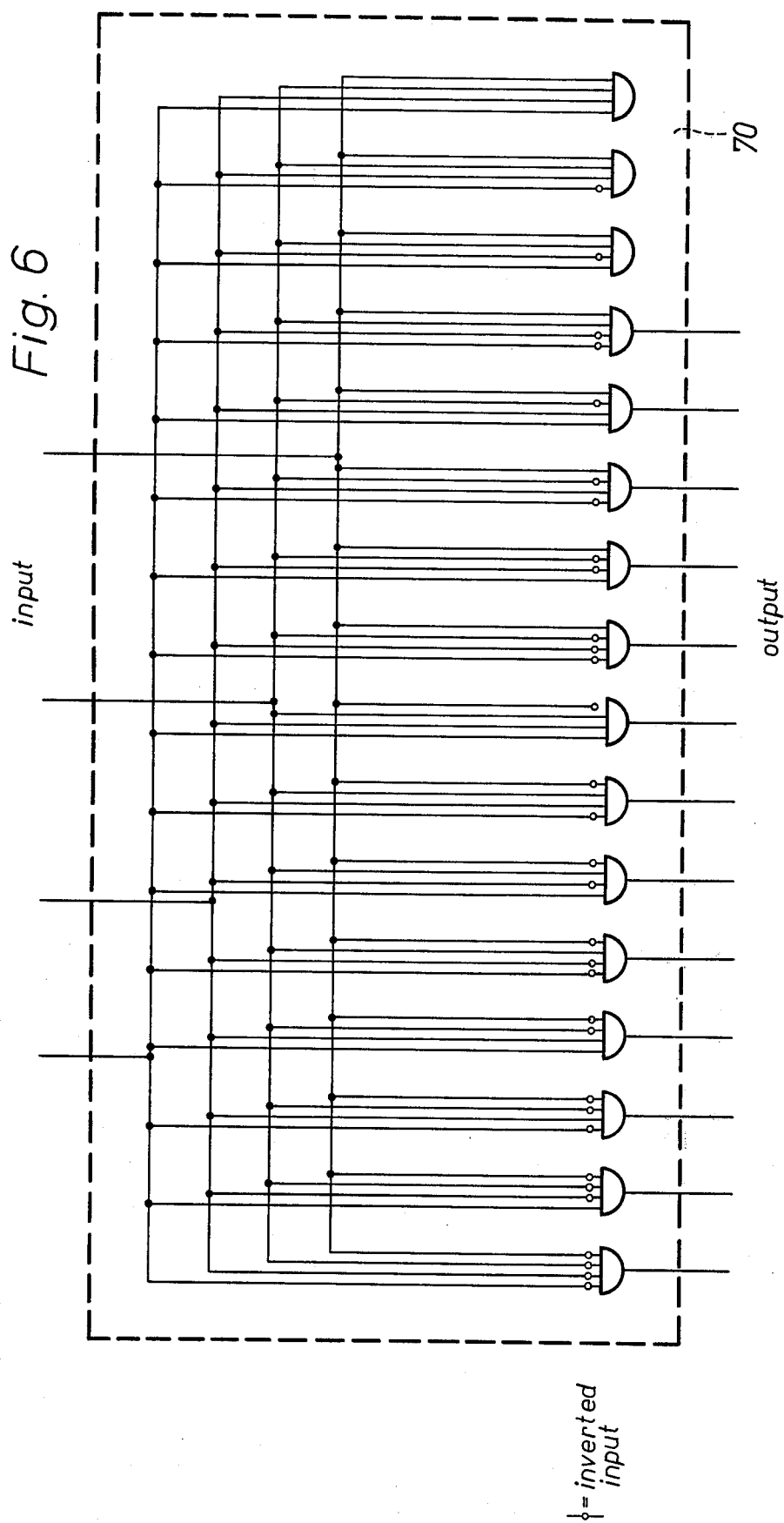

ELECTRONIC STORAGE, INDICATOR AND EXPOSURE TIME CONTROL DEVICE FOR PHOTOGRAPHIC CAMERAS

This is a Continuation of Application Ser. No. 437,142, filed Jan. 28, 1974, now abandoned.

Applicants incorporate by reference the disclosures of assignee's copending Applications Ser. Nos. 346,576 now U.S. Pat. No. 3,785,264 and 383,295, filed Mar. 30, 1973 and July 26, 1973 in the U.S. Patent Office.

Application Ser. No. 346,576 discloses the state of the art of camera shutters having electronically controlled delay releasers. The apparatus of the present invention is useful with these shutters.

According to application Ser. No. 383,295, an apparatus for storing a voltage analogous to an exposure parameter in photographic cameras comprises:

a. an electronic timer generating time signals for controlling the camera shutter;

b. an exposure meter block circuit including an exposure meter and an analog computer to which signals analogous to the luminous density of the object are transmitted for generating an exposure parameter analogous voltage signal;

c. a storage unit having therein an analog-to-digital converter and a digital-to-analog converter generating voltage output signals; and d. a comparator connected to said exposure parameter analogous voltage signal and said output voltage signals for comparing those signals whereby signals of equal magnitude stop said analog-to-digital converter so that the magnitude of said retained output signal represents a voltage identical to said exposure parameter analogous voltage.

BACKGROUND OF THE INVENTION

The present invention relates to an electronic device for storing and indicating illumination parameters and for controlling the exposure time in photographic cameras.

In the case of photographic cameras it is a known practice to electronically control the exposure time, possibly in direct dependence on the brightness of the object. In this method, one or more condensers which are connected in at different times depending on the exposure time are generally discharged or charged. However, it is very difficult to control the stability with regard to time of the condensers which are by necessity large. Owing to the capacitances and resistances required for time formation, limits are placed on miniaturization. The circuitry is also generally complicated by the fact that in easy to operate cameras, apart from the logarithm, the exposure time is obtained from the most varied parameters such as the intensity of illumination of the object, the aperture and film sensitivity. To obtain the exposure time itself, a "delogging" operation must be effected. If semi-conductor diodes are used for this purpose, the undesirable temperature variation of the diodes is also involved which can lead to appreciable errors. In addition, the storage and indication in analog form of a value serving as a measurement of the exposure time is a complicated method.

SUMMARY OF THE INVENTION

The object of the present invention is therefore to obviate these disadvantages and to provide a device for storing and indicating exposure parameters and controlling the exposure time and which makes possible extensive miniaturization of the device.

According to the present invention, this task is solved in that a digital storage means in the form of a plurality of binary stages is provided (analog/digital converter), the various states of which correspond to different object illumination intensities and in that the time forming part consists of a combination of binary ratio reducers and logic gratings which are selected by the analog/digital converter or by manual adjustment and in that a generator is provided, the impulses of which control the time forming part.

The exposure time information which is present in the form of an analog value is digitized in the control device according to the invention and is stored in this form. The time forming part is then controlled according to the storage state and indication means in the form of small lights are provided.

The preselected aperture is as already present in the form of an analog value. The control device according to the invention is constructed so that the time can also be directly preselected by means of a manual adjustment element. If corresponding time data is then added to the intensity data in an analog computer, a value is obtained which is analogous to the aperture to be formed. When this analog value is digitized, a storage state is obtained which indicates the aperture to be anticipated. The indicator lights then indicate, for example, in combination with a reversible scale, either the exposure time to be anticipated or the aperture to be expected.

BRIEF DESCRIPTION OF THE DRAWINGS

Other features of the invention are represented in more detail with reference to the accompanying drawings, in which:

FIG. 1 shows the wiring diagram of a first embodiment of the control device;

FIG. 2a shows the wiring diagram of a programmable ratio reducer;

FIG. 2b shows an impulse diagram at the input and outputs of the ratio reducer;

FIG. 2c shows the states of the binary ratio reducer within the programmable ratio reducer at different reduction ratios;

FIG. 4 is a simplified circuit diagram of the control device; and

FIG. 5 is a view of the indicator lights in the view finder;

FIG. 6 is the wiring diagram of a 4 to 16 decoder.

DESCRIPTION OF THE PREFERRED EMBODIMENTS

Figure 3:
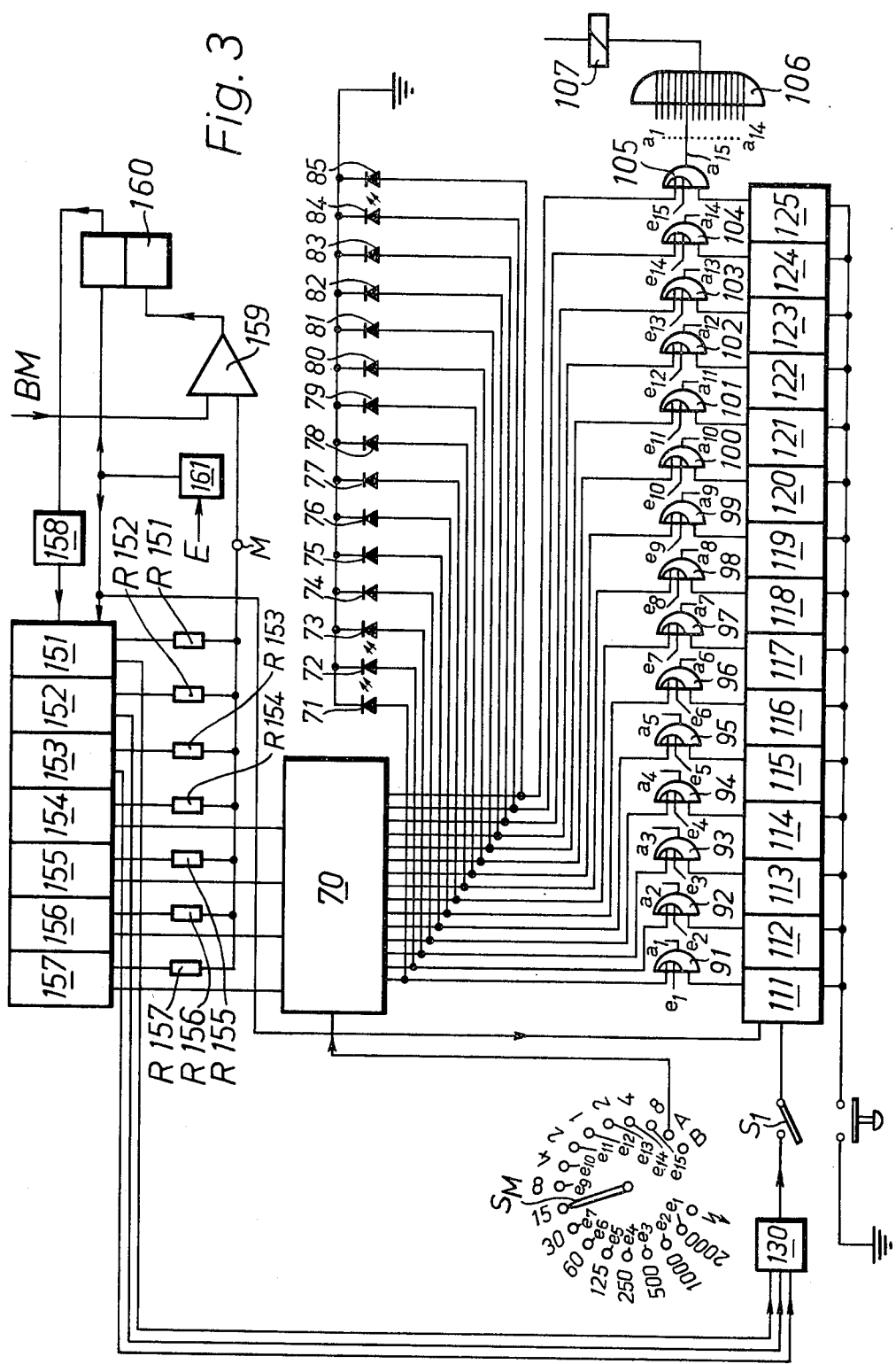
FIG. 3 is a wiring diagram of a second embodiment of the control device.

The circuit of the embodiment according to FIG. 1 consists of a storage part comprising parts 1 - 26 and a time former comprising parts 31 - 64. The core of the storage section is an analog/digital converter containing the binary stages 1 - 6. Transistors 8 - 13 are connected in series with the upper outputs of the binary stages. The transistors are in the conducting state when there is a zero potential at these outputs. Individual currents which are totalized in an impedance comverter 15 then flow through transistors and the resistances 8a - 13a associated therewith. The totalizing current is built up in stepped form and analogous therewith is the increase in the voltage at the output of the impedance converter 15. This voltage is supplied to a measuring element 16 indicating information in analog form and to a comparator 17. At the other input of the comparator is the voltage formed by the exposure meter 80 according to the brightness of the object and allowing for the sensitivity of the folm and for other exposure constants. A signal appears at the output of the comparator 17 when there is uniformity of the voltage from the impedance converter 15 and from the exposure meter 80. The binary stages 1 – 6 of the analog/digital converter are controlled by a generator 25. An RS flip-flop 20 and a repeating generator 26 are also present.

The storage part operates in a known manner in that the binary stages are run up by the generator which causes the totalizing current in the impedance converter 15 and also the voltage at the input of the comparator 17 to increase in stepped form. When there is uniformity of the voltages a signal is produced at the output of the comparator 17 which trips the RS flip-flop 20 and thus stops the generator 25. The state of the analog/digital converter at this point which represents a digital value of the requisite exposure time is at first retained. This only applies for a very short period of time. As stated above, a repeating generator 26 is connected via a switch 26a both with the reset inputs of the binary stages 1 – 6 and with the RS flip-flop 20. This repeating generator 26 emits, for example every 50 ms, an impulse which returns the analog/digital converter to zero and again overturns the RS flip-flop 20 so that the analog/digital converter can run up again after 50 ms and can readjust itself to the altered lighting conditions.

This method of digitizing analog voltage supplied by the exposure meter 80 is not a part of the subject of the invention and can thus be subject to a large number of modifications which are all within the scope of the average person skilled in this particular art.

In the present embodiment the binary stages 1 and 2 are coupled in a special way and together do not count to 4 but only to 3. Thus they only recognize the states HL, LH and LL and not the state OO. The current flowing past the impedance converter 15 also increases in stepped form at this point during counting. However, the current from the transistor 10 is not divided into four stages by the transistors 8 and 9 but only in 3 stages.

The quantization of the times for actuation of the shutter can in principle be selected as accurately as desired, but the expenditure which increases corresponding to the degree of accuracy should only be taken as far as necessary. Accordingly, it is advisable to use as standard measurement the accuracy with which the film sensitivity is indicated. This is only accurately indicated at 1° DIN (German Industrial Standard) corresponding to ⅓ light value. As var as the exposure time is concerned, this means that between two stages of the exposure times $t_e$, it must be possible to have two intermediate values, namely $t_{e1}.2^{1/3}$ and $t_{e1}.2^{2/3}$, for example, according to DIN (German Industrial Standard) 19016. The next value is then either $t_{e2}$ or $2.t_{e1}$.

Hence the binary stages 3 – 6 here indicate the time $t_e$ and the binary states 1 and 2 indicate whether this value is to be multiplied by $2^0$, $2^{\frac{1}{3}}$ or $2^{\frac{2}{3}}$. Similarly, a logical correlation of the shutter times and the state of the binary stages after these have reached their storing stage is produced. In this "H" means that there is a zero potential at the upper output of the binary stages and "L" means that there is a positive potential (ca. + 3V) at this output, there being OV at the lower output. The transistors 8 – 13 are thus in the conducting state when there is a zero potential at the upper output.

It is now a question of transferring these logical states to a system of counters so that the desired shutter times can be formed from these.

The above-mentioned time forming device comprising the parts 31 – 64 represents a system of this type. It consists of the binary ratio reducers coupled in groups, 32 and 33, 37 and 38, 42–45, 49–56, and 60. Each of these groups is connected togehter by two AND gates and one OR gate 34 – 36, 39 – 41, 46 – 48, 57 – 59 which are controlled by the binary stages of the analog/digital converter. A switch 64 is provided with which all the binary ratio reducers are set at 0 before the beginning of the exposure time. The switch 64 may be connected to the switch 26a so that it is temporarily closed, for example, when the switch 26a is open.

A generator 61 is also provided. This is constructed in the form of a multivibrator and in the diagram oscillates with a frequency of 16,384 Hz. As its frequency accuracy corresponds directly to the exposure time accuracy, a frequency accuracy of ca. ± 3 – 5 percent is selected. Its impulses ae transmitted to a ratio reducer 31 via an AND gate 62.

FIG. 2a represents by way of example a view of the inside structure of the ratio reducer 31. This figure shows a circuit for scaling down by the factor 4, 5 or 6. Depending on the combination of the input signals $a$ and $b$, an AND gate 207, 208 or 209 is activated via the gates 210 – 212 and the inverters 213 and 214. After the desired number of impulses at the input E and L signal appears at the triple OR input of the RS flip-flop 206 and trips into the resetting position. In this position the binary counters 201 – 203 are reset and after a half period of the input frequency the RS flip-flop 206 is again overturned by the AND gate 205 and a new counting cycle begins.

FIG. 2b shows the impulse diagrams at the input and at the outputs according to the reduction ratio, and FIG. 2c shows the state of the binary counters 201 – 203 at the various reduction ratios. The latter state is only at 000 for a very short period of time before resetting.

The ratio reducer 31 thus scales down the frequency of the generator 61 by the factors 4, 5 or 6 according to the logical state of its inputs. As a result, 2048 Hz, 2048.1/1, 25 Hz or 2048.1/1, 5 Hz are present at the output of the next binary ratio reducer 32. The state of the inputs of the ratio reducer 31 is determined by the binary stages 1 and 2 of the analog/digital converter. These indicate whether illumination is to be provided with $t_{e1}$, $t_{e1}.2^{\frac{1}{3}}$ or $t_{e1}.2^{\frac{2}{3}}$ It will be understood that $2^{\frac{1}{3}}$ is an approximation for 1.25 and $2^{\frac{2}{3}}$ an approximation for 1.5. The accuracy of the approximination may be regarded as sufficient in this case. The approximation can obviously be rendered as accurate as desired by using a more complicated programmable frequency ratio reducer.

The following Table shows coordination of the a–f outputs of the binary stages 1 – 6 with respect to the individual exposure times.

| Shutter Speed | Storage Coordination fedcba |
|---|---|
| 2048 | HHHHLL |
|  | HHHHHL |
| — | HHHHLH |
| 1024 | HHHLLL |
|  | HHHLHL |
| — | HHHLLH |
| 512 | HHLHLL |

1 -continued

| Shutter Speed | Storage Coordination fedcba |
|---|---|
| — | HHLHHL |
| — | HHLHLH |
| 256 | HHLLLL |
| — | HHLLHL |
| — | HHLLLH |
| 128 | HLHHLL |
| — | HLHHHL |
| — | HLHHLH |
| 64 | HLHLLL |
| — | HLHLHL |
| — | HLHLLH |
| 32 | HLLHLL |
| — | HLLHHL |
| — | HLLHLH |
| 16 | HLLLLL |
| — | HLLLHL |
| — | HLLLLH |
| 8 | LHHHLL |
| — | LHHHHL |
| — | LHHHLH |
| 4 | LHHLLL |
| — | LHHLHL |
| — | LHHLLH |
| 2 | LHLHLL |
| — | LHLHHL |
| — | LHLHLH |
| 1 | LHLLLL |
| — | LHLLHL |
| — | LHLLLH |
| ½ | LLHHLL |
| — | LLHHHL |
| — | LLHHLH |
| ¼ | LLHLLL |
| — | LLHLHL |
| — | LLHLLH |
| ⅛ | LLLHLL |

The control device operates in the following manner: Supposing first that the information HHHHLL is stored in the binary stages of the analog/digital converter. According to the above Table, this corresponds to an exposure time of 1/2048 sec. This means that an L signal which causes the shutter to close must appear at the output $A_v$ of the binary ratio reducer 60 1/2048 sec after the shutter has been opened, i.e. after the switch 63 has been closed. The AND gates 34, 39, 46 and 57 are blocked as an H signal is at the outputs of the binary stages 3 - 6 of the analog/digital converter. The binary stages 1 and 2 contain LL which means that the ratio reducer 31 is to be scaled down by the factor 4.

As the AND gates 35, 40, 47 and 58 are released, the frequency of 2048 Hz obtained as a result of the scaling down process arrives directly at the input of the last binary ratio reducer 60 via the OR gates 36, 41, 48 and 59. As binary ratio reducers always switch with the transition from L to H, there appears after 1/2048 second at $A_v$ an L signal which causes the shutter to close.

The mode of operation will be described once more with reference to a random exposure time, for example, 1.2½ sec. According to the above Table, the logical correlation for this is LHLLLH. The two final places indicate that the ratio reducer 31 is to scale down by the factor 6. The first four places indicate that the gates 35, 40, 46 and 58 are blocked and the gates 34, 37, 47 and 57 released. Thus the device scales down 16384 Hz by 6 (that is, the ratio reducer 31) by 2 (that, the binary ratio reducer 32), by 2 (binary ratio reducer 33) by 4 (binary ratio reducers 37, 38) and by 256 (binary ratio reducers 49 -56). This produces 16384 Hz:($2^{12}$.6) = 16384 Hz: (4096.6) = 4:6 Hz = ⅔ Hz. Hence the exposure time is 1.5 seconds.

FIG. 3 represents a simplified view of another embodiment of a shutter control device having a completely digital mode of operation. This shutter control device once again contains an analog/digital converter consisting of the binary stages 151 - 157, to which is connected a 1 from 16 decoder bearing the reference number 70, as disclosed in FIG. 6.

The binary stages are provided at their output with throw-over switches. As a result, a zero voltage or + supply voltage is always present at the outputs. In a similar manner to the embodiment of FIG. 1, the analog/digital is again controlled by a generator 158 and the voltage which builds up at the center of colineation M of the resistances $R_{151} - R_{157}$ connected in series with the binary stages is supplied to the input of a comparator 159, at the other input of which is the voltage supplied by the exposure meter. As in the case of the embodiment according to FIG. 1, the output from the comparator 159 passes to an RS flip-flop 160 and from there to a generator 158 and on to the reset inputs of the binary stages. A repeating generator 161 is also provided.

The decoder is used to control a number of AND connections 91 - 105 and a similar number of light emission diodes (LED's) 71 - 85. At the other input of the AND connections is a chain of binary ratio reducers 111 - 125 which are controlled by a timer 130 which itself is connected to the binary stages 151, 152 and 153 of the analog/digital converter. An OR gate 106 is connected in series with the AND gates. At the output of this OR gate 106 is a solenoid 107 which closes the shutter.

The advantage of this circuitry consists in that all logic parts can be mounted on a single silicon plate approximately 4×4 mm². In addition, only the comparator, the resistances $R_{151} - R_{157}$ and a condenser and three resistances (not shown) are required for wiring the timer 130. As the expenditure on the silicon plate is only minimally dependent on the scope of the logic system, this represents a more economical method of manufacture thant the conventional hybrid circuits. The expenditure on adjustment operations is also kept to a minimum.

The device represented in FIG. 3 operates in the following manner: The voltage at the input of the comparator coming from an exposure meter or from the potentiometer is a logarithmically condensed measurement of the exposure time to be formed. It is repeatedly read into the analog/digital converter. After the input of a signal at input E of the repeating generator 161, the voltage read in last is retained or stored. Even before the final storage, one of the 15 LED's 71-85 corresponding to the voltage read in is caused to light up via the decoder 70, thereby indicating the exposure time to be expected in jumps of the standard time sequence.

With the last storage part, it is simultaneously ensured that the binary ratio reducers 111 - 125 are turned to the zero state. There is now an L signal at one of the 16 outputs of the decoder and an H signal at the others.

Simultaneous with the opening of the first blade section of the camera shutter, the switch $S_1$ is closed so that the impulse sequence of the timer 130 can now reach the binary ratio reducers 111 - 125. The outputs of the binary ratio reducers are each connected by way of gates 91 - 105 to an output of the decoder. If, as a result of the counting of the binary ratio reducers, an L signal now appears at the output of one of these binary ratio reducers, and if an L signal is now produced via the decoder 70 at the output of the AND connection associated with the corresponding outout of this binary ratio reducer, an L signal also appears at the output of this AND connection. With this, there also appears at the output of the OR gate 106 an L signal which actuates the shutter solenoid 107 of the camera so that the shutter is closed. If the timer emits an impulse sequence having the frequency of 2 KHz, depending on the output state of the decoder 70, that is, depending on the value of the input voltage of the exposure meter or potentiometer at the comparator 159, the times of 1/2000 second - 16 seconds can be formed (the LED output and the binary ratio reducer for 16 sec. are not shown).

The decoder 70 is also controlled by a manual adjuster $S_M$ of the camera and with the above-mentioned mode of operation, this manual adjuster $S_M$ is set at A = automatic, and in this position has released the decoder 70. If an exposure time is to be selected manually, the selection switch is moved from position A to an indicated exposure time, the decoder is thus blocked and the necessary L signal for one of the AND gates 91 - 105 which is provided by the decoder during A operation is now provided directly by the selection switch. The above-mentioned desired exposure times in the standard time sequence may also be obtained in this way.

The exposure times which lie between the standard time sequence are obtained from the data present in the storage parts 151, 152, and 153. As $2^3 = 8$ pieces of information may be obtained, seven additional intermediate times may be formed between the times in the normal times sequence (differing by the factor 2). These are obtained in that the frequency of the timer is altered according to a geometrical sequence of $2^0$, $2^{\frac{1}{4}}$, $2^{\frac{1}{8}}$. The frequency of the timer may be determined, for example, by an RC network. This can only be altered in a desired way according to the times of the intermediate values in that appropriate resistances are connected in by an additional 1 from 8 decoder according to the state of the storage parts 151, 152, 153. However, if an additional decoder is not used, sufficient accuracy can be achieved if three simple resistances are connected in directly by the stages 151, 152 and 153, thereby enabling the eight desired frequencies to be approximated.

The device according to FIG. 4 represents a further development of the device according to FIG. 3. The improvement over FIG. 3 consists in that instead of a 4 to 16 decoder only a 3 to 8 decoder 70' is required. In addition, the number of binary ratio reducers is reduced by half. Only the binary ratio reducers 111 - 118 are required. Furthermore, the OR gate 106' only has eight inputs. For the rest, identical reference numbers designate the same parts as in FIG. 3.

These reductions are made possible in that the binary stage 157 acts on the timer 61' so that an additional frequency determining element provided therein is energized. In addition, the LED elements 71 - 86 are divided into two groups and are connected in by the binary stage 157 and partially via the inverter 162. Two LED elements are thus connected in at each output of the decoder 70'. A determination of which of the two LED elements is lit up is also determined via the binary stage 157. The additional frequency determining element in the timer 61' is in the present embodiment, a condenser $C_2$ switched by a switch $S_d$. This condenser $C_2$ increases the time determining total capacity $C_1 + C_2$ by the factor $2^8$. The remaining frequency determining elements which have already been described with reference to FIG. 3 are the resistance $R_a$, $R_b$, $R_c$, which are connected to or disconnected from the resistance R by the switches S, $S_b$, $S_c$ of the binary stages 151, 152, and 153.

FIG. 4 also shows the possibility of time selection by the adjustment of a potentiometer. A potentiometer 87 is provided near the exposure meter 80. This potentiometer 80 can be connected in via a switch $S_e$ in place of the exposure meter. In this case, the exposure time is manually adjustaed in that the voltage tapped from the potentiometer which constitutes a measurement for the exposure time is fed in at the comparator 159 in place of the voltage from the output of the exposure meter part 80.

As was already mentioned in the introduction to the specification under the conditions indicated therein, the indicator lights can also be used to indicate the aperture to be anticipated. A reversible scale is required for this purpose. A scale of this type is represented in FIg. 5. Four windows A, B, C and D are provided near the viewfinder 170, the light 81 - 85 being arranged between fields A and B. In a manner which is not represented further, individual fields are covered during switching in the various modes of operation. When the device is being operated in the manner described chiefly in this specification, as an exposure time control device (aperture priority), fields B and D are covered and when the aperture has been selected, the time to be anticipated is indicated to the operator in a simple manner by the small lights. However, if the time is preselected by means of a manual adjuster and the intensity information added thereto in an analog computer and the aperture analog value then obtained in digitized, the lights indicate the aperture to be expected (time priority). In this case the fields A and C are covered by a switching process so that the lights are now opposite to the apertures. If provision is made to completely eliminate the correlation between time and aperture and to manually engage these parameters, fields A and B will have to be covered.

If the device is used in a camera having time priority operation (automatic aperture), a measurement for the aperture to be formed is first stored in the storage part in the manner described. In the embodiments according to FIGS. 3 and 4, the aperture is also indicated by means of the described LED's. When the aperture has been engaged by actuating the shutter release buttom, a measurement for the time to be formed is fed into the same analog/digital computer 151-160 and this time is then formed by the time forming part 61'; 91-93; 106'; 111-118 and $S_1$.

It should be mentioned that a combination of the devices according to FIGS. 1 and 4 is obviously also possible in that the long counting chain of the binary counters 49-56 in FIG. 1 can be omitted by taking the following steps. The binary ratio reducer 60 is connected directly to the output of the OR gate 48. The generator 61 is controlled by the binary stage 6. For the logic state in which the counting chain 49-55 would have been connected in, the frequency of the generator 61 is reduced by the factor $2^8$ by switching a time determining element.

We claim:

1. In an electronic device for storing and indicating illumination parameters and for controlling the exposure time for photographic cameras having means for measuring the exposure time and means for generating said time, the improvement comprising said means for measuring exposure time including an analog/digital first binary counters and having a plurality of stages which correspond to different exposure times depending on the exposure parameters, and wherein said means for generating said exposure time comprise:
  a. a pulse generator admitting pulses at a frequency the numerical value of which consitutes a multiple of the reciprocal value of the shortest exposure time;
  b. a pulse frequency reducer connected to said pulse generator and controlled by said first sequential first binary counters of said analog/digital converter to reduce said pulse generator frequency by a predetermined ratio in dependence on the stage ov said first sequential counters; and
  c. said second sequential binary counters connected to said pulse frequency reducer and having a plurality of AND and OR gates for subdividing into counting chains controlled by said first binary counters, said counting chains switchingly connected to said pulse frequency reducer by said AND and OR gates the reduction of the pulse frequency achieved thereby corresponding to the frequency of said sequential first binary counters.

2. The electronic device of claim 1, wherein a 4 to 16 decoder is connected to said second sequential first binary counters, said decoder having outputs and AND gates connected to the outputs of said binary ratio reducers of said means for generating time, said cameras having a shutter solenoid and an OR gate, said AND gates having outputs connected to actuate said shutter solenoid by way of said OR gate.

3. The electronic device of claim 2, further comprising indicating means connected to said outputs of the decoder to indicate time.

4. The electronic device of claim 2 further comprising indicating means connected to said outputs of the decoder to indicate aperture parameters.

5. The electronic device of claim 1, wherein said analog/digital converter has means for selecting positions and said means for generating time has means for switching by a multiple corresponding to said positions.

6. In an electronic device for storing and indicating illumination parameters and for controlling the exposure time for photographic cameras having means for measuring the exposure time and means for generating said time, the improvement comprising said means for measuring exposure time including an analog/digital converter with a digital support part having a plurality of first binary stages provided with outputs and throw switches, said throw switches having a first position for a zero voltage and a second position for a supply voltage to be presented at each output and having stages which correspond to different exposure times depending on exposure parameters and wherein said means for generating said exposure time comprise:
  a. a pulse generator emitting pulses at a frequency the numerical value of which constitutes a multiple of the reciprocal value of the shortest exposure time;
  b. a 4 to 16 decoder connected to the last four of said binary stages for selecting a supply voltage that corresponds to the prevailing object brightness, said decoder having outputs;
  c. AND gates having a first input connected to the outputs of said 4 to 16 decoder, said AND gates having outputs and second and third inputs;
  d. a chain of binary ratio reducers connected to said input of said AND gates;
  e. a pulse generating timer controlling said chain of binary ratio reducers and being itself controlled by the first three of said binary stages;
  f. an OR gate to which said outputs of said AND gates are connected;
  g. a solenoid connected to said OR gate for closing a camera shutter on the appearance of a first signal at the OR gate output; said 4 to 16 decoder selecting the supply voltage carrying output of said binary stages which is in accordance with the object brightness and connecting same to the respective connected AND gate, and when, after the corresponding time interval, the attached binary ratio reducer also supplies one signal to said AND gate the output of said AND gate carries a one signal to the OR gate whereupon the camera shutter is closed; and
  h. means for blocking said 4 to 16 decoder and means for providing a one signal directly to said third input of one of said AND gates.

7. The electronic device of claim 6 further comprising light emitting diodes connected to said outputs of said 4 to 16 decoder with one of said light emitting diodes connected to the output which carries the one signal, thereby indicating the exposure time that is executed when lighted.

8. In an electronic device for storing and indicating illumination parameters including an exposure meter for controlling the exposure time for photographic cameras having means for measuring the exposure time and means for generating said time, the improvement comprising said means for measuring exposure time including an analog/digital converter with a digital storage part having a plurality of first binary stages provided with outputs and throw switches having a first position for a zero voltage and a second position for a storage voltage to be present at each output and having a plurality of stages which correspond to different exposure times depending on exposure parameters, and wherein said means for generating said exposure time comprise:
  a. a pulse generator emitting pulses at a frequency the numerical value of which constitutes a multiple of the reciprocal values of the shortest exposure time;
  b. a 3 to 8 decoder connected to three of said binary stages for selecting a supply voltage that corresponds to the prevailing object brightness, said decoder having outputs;
  c. AND gates having a first input connected to said outputs of said 3 to 8 decoder, said AND gates having outputs and second and third inputs;
  d. a plurality of binary ratio reducers connected to said second input of said AND gates;
  e. a pulse generaor timer controlling said plurality of binary ratio reducers and being itself controlled by the first three of said binary stages;
  f. an additional frequency determining element in said pulse generating timer for increasing the pulse frequency by the factor $2^8$, said element being controlled by the last one of said binary stages;
  g. an OR gate to which said outputs of said AND gates are connected;
  h. a solenoid connected to said OR gate for closing a camera shutter on the appearance of one signal at the OR gate output, said 3 to 8 decoder selecting the supply voltage carrying output of said binary stages which is in accordance with the object brightness and conducting same to the respective connected AND gate, and when, after the corresponding time interval, the attached binary ratio reducer also supplies a one signal to said AND gate, the output of said AND gate carries one signal to the OR gate whereupon the camera shutter is closed, and when said time interval is longer the last binary stage reduces the pulse frequency of said pulse generating timer by the appropriate factor; and i. said means for measuring the exposure time including a switch and a potentiometer for separating said exposure meter from the device and connecting said potentiometer to said device for manual adjustment of said exposure time.

9. The electronic device of claim 8 further comprising light emitting diodes for a first group connected between said outputs of said 3 to 8 diodes and said last binary stage, an inverter, and a second group connected between said first group and said second group via said inverter.

10. The electronic device of claim 8, further comprising indicating means connected to said outputs of the decoder to indicate time.

11. The electronic device of claim 10, wherein said indicating means are divided into at least two groups having different positions for said second sequential first binary counters to determine which groups are activated to furnish an indication.

12. The electronic device of claim 11, further comprising means for selecting said time, said indicating and said means for generating time.

* * * * *